United States Patent
Fair et al.

(10) Patent No.: US 7,494,691 B1
(45) Date of Patent: Feb. 24, 2009

(54) COATING CERAMIC FIBER TOWS AND WOVEN ARTICLES

(75) Inventors: Geoff E. Fair, Centerville, OH (US); Emmanuel E. Boakye, Clayton, OH (US); Triplicane A. Parthasarathy, Beavercreek, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 733 days.

(21) Appl. No.: 11/021,900

(22) Filed: Dec. 21, 2004

(51) Int. Cl.
*B05D 7/00* (2006.01)

(52) U.S. Cl. .................................................. 427/215

(58) Field of Classification Search ............ 427/213.3, 427/213.31, 213.32, 215
See application file for complete search history.

(56) References Cited

U.S. PATENT DOCUMENTS

| | | | | |
|---|---|---|---|---|
| 4,452,934 | A | * | 6/1984 | Swafford .................. 524/243 |
| 5,164,229 | A | | 11/1992 | Hay |
| 5,217,533 | A | | 6/1993 | Hay et al. |
| H1682 | H | | 10/1997 | Brown et al. |
| 5,951,764 | A | | 9/1999 | Hay et al. |
| 6,667,074 | B2 | * | 12/2003 | Kobayashi et al. ......... 427/140 |
| 6,872,275 | B2 | * | 3/2005 | Ko et al. .................. 156/181 |

OTHER PUBLICATIONS

Boakye et al., J. Am. Ceram. Soc. 82, 191, pp. 2321-2331, 1999.*
Cinibulk, J. Am. Ceram. Soc., 80, 2, pp. 453-460, 1997.*
Boakye, Mah, Cooke, Keller and Kerans, "Initial Assessment of the Weavability of Monazite-Coated Oxide Fibers," J. Am. Ceram. Soc., vol. 87, 1775-1778 (2004).
Kerans, Hay, Parthasarathy and Cinibulk, "Interface Design for Oxidation-Resistant Ceramic Composites," J. Am. Ceram. Soc., vol. 85, 2599-2632 (2002).
Boakye, Hay and Petry, "Continuous Coating of Oxide Fiber Tows Using Liquid Precursors: Monazite Coatings on Nextel 720," J. Am. Ceram. Soc., vol. 82, 2321-2331 (1999).
Boakye, Petry, Hay and Douglas, "Monazite Coatings on Nextel 720, 610 and Tyranno-SA Fiber Tows; Effects of Precursors on Fiber Strength," Ceram. Eng. Sci. Proc., vol. 21, 229-236 (2000).
Boakye, Hay, Mogilevsky and Douglas, "Monazite Coatings on Fibers: II, Coatings without Strength Degradation," J. Am. Ceram. Soc., vol. 84, 2793-2801 (2001).

(Continued)

*Primary Examiner*—Michael Cleveland
*Assistant Examiner*—Robert Vetere
(74) *Attorney, Agent, or Firm*—AFMCLO/JAZ; Steve Sayeedi

(57) ABSTRACT

An improved method for coating ceramic fibers and woven cloths of ceramic fibers is disclosed, wherein the ceramic fibers are thoroughly wetted with precursors in a solution before the precursors react to form a coating by heterogeneous nucleation and growth. The fibers are then rinsed and fired and, where desired, the process may be repeated in stages to increase the coating thickness as desired. This method is amenable to operation in both the batch and continuous modes. This flexible method reduces both the cost and time of producing ceramic matrix composites (CMCs).

9 Claims, 1 Drawing Sheet

OTHER PUBLICATIONS

Hay, Boakye and Petry, "Effect of Coating Deposition Temperature on Monazite Coated Fiber," Journal of the European Ceramic Society, vol. 20, 589-597 (2000).

Hay and Boakye, "Monazite Coatings on Fibers: I, Effect of Temperature and Alumina Doping on Coated-Fiber Tensile Strength," J. Am. Ceram. Soc., vol. 84, 2783-2792 (2001).

Morgan and Marshall, "Functional Interfaces for Oxide/Oxide Composites," Materials Science and Engineering, vol. A162, 15-25 (1993).

Cinibulk, "Deposition of Oxide Coatings on Fiber Cloths by Electrostatic Attraction," J. Am. Ceram. Soc., vol. 80, 453-460 (1997).

* cited by examiner

COATING CERAMIC FIBER TOWS AND WOVEN ARTICLES

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention relates to the field of synthetic fibers, and in particular, the coating of ceramic fibers and woven articles comprised of ceramic fibers.

2. Description of the Related Art

Ceramic materials are attractive for a wide range of applications, offering important advantages over other materials. Such advantages include, for example, low weight, high-temperature resistance and thermal stability, erosion resistance, chemical inertness and environmental stability. Ceramic materials are therefore highly desirable for a number of applications despite their brittleness, flaw sensitivity and propensity for catastrophic failure. It is highly desirable to utilize the advantages of ceramic materials while increasing both the strength and toughness of ceramic materials thereby overcoming the drawback of their brittle properties.

A common technique to reduce the brittle behavior of ceramics involves the creation of ceramic matrix composites by incorporating high-strength ceramic fibers as reinforcements into ceramic matrices. Numerous commercially available fibers are available for reinforcing-ceramic matrices (e.g., Nextel 610 and Nextel 720, manufactured by the 3M Company, and Sylramic, manufactured by Composite Optics, Inc.). In order to realize the benefits of ceramic fiber reinforcement, the matrix must transfer loads to the fibers but become decoupled from the fibers during fracture so that the fibers remain intact and thus continue to bear the loads.

The load transfer and decoupling capabilities of the composite can be greatly enhanced through the use of functional fiber coatings (such as carbon, boron carbide, hibonite and monazite, for example). Various methods have been used to apply such coatings to ceramic fibers, including chemical vapor deposition (CVD) and continuous dip-coating using solution and sol derived precursors. These coating processes, which are time and labor intensive, are generally applicable to multi-filament tows and are not typically amenable to coating cloths or woven preforms of ceramic fibers. Existing methods for coating woven cloths and preforms, such as CVD, for example, are typically very costly, requiring considerable capital investments in the necessary equipment. In addition, such methods generally necessitate the handling of hazardous chemicals, which further imposes costs and complexities.

Accordingly, there is a need for an improved method of coating ceramic fibers and cloths and woven preforms of ceramic fibers.

SUMMARY OF THE INVENTION

An object of the invention is to provide an improved method of coating ceramic fibers.

Another object of the invention is to provide a method for coating cloths and woven preforms of ceramic fibers.

Another object of the invention is to provide a method for coating ceramic fibers with a high degree of uniformity.

Another object of the invention is to provide a method for applying functional fiber coatings in a rapid and cost-effective manner with minimal capital investment.

It is another object of the invention to provide a method of coating ceramic fibers adaptable for use in both the batch and continuous modes.

Yet another object of the invention is to provide a flexible method for providing a coating of ceramic fibers of a desired thickness.

To meet these and other objects, the present invention provides a method for coating ceramic fibers whereby the coatings are applied by precipitation from solution via heterogeneous nucleation and growth on the fiber surface. The method applies to the coating of ceramic fibers in both the batch and continuous modes. The method involves the combining of coating precursors into a solution under circumstances where the reaction of the precursors are minimized or prevented. The ceramic fibers are then added to the solution where they become saturated. The circumstances minimizing or preventing reaction are then changed to allow reaction of the precursors thereby allowing nucleation and growth of the coating on the surface of the ceramic fibers.

Initially, precursor solutions, such as lanthanum citrate and phosphoric acid, for example, are chilled to a low temperature—of approximately five degrees Celsius (5° C.). At these low temperatures, the reaction kinetics between lanthanum citrate and phosphoric acid proceeds extremely slowly as a consequence of the chelation of the lanthanum ions by the citrate molecules.

The rate of reaction in solution between lanthanum citrate and phosphoric acid depends—in addition to temperature—on the ratio of lanthanum to citrate as well as on the solids loading. Typically, the solution is prepared to yield a solids loading of 1-100 g/L of monazite.

The ceramic fibers are combined with the chilled precursor solutions in a reaction vessel where they are typically warmed or allowed to warm to the desired temperature (approximately room temperature or about 17-24° C.) such that they react to form the desired coating material, such as, in this example, rhabdophane ($LaPO_4 \cdot xH_2O$)—a hydrated monazite precursor. The precursor solution effectively penetrates into woven cloths or preforms and thoroughly wets the fibers prior to chemical reaction, thereby resulting in a high degree of uniformity. Once the temperature is raised, the coating forms through heterogeneous nucleation and growth on the fiber surfaces. If desired, the fibers may be agitated in the chilled solution to improve the uniformity of the fiber coating.

To ensure completeness of reaction, the mixture can be further heated. For rhabdophane on Nextel 610 and 720 fiber tows and cloths, for example, the reactant mixture may be heated to about 35-45° C. to facilitate complete nucleation and growth.

Once the reaction is complete, the fiber cloths or tows are removed from the reaction vessel and rinsed in swirling de-ionized water, for example, to remove any unreacted solution precursors. The fibers are then dried and fired to sinter the coating to the fibers. The entire process can be repeated as desired to obtain thicker coatings.

The entire process is also amenable to operation in continuous mode, whereby continuous tows or cloths of ceramic fibers may be passed through the chilled precursor solution and then exposed to a heat lamp or passed through hot immiscible liquid. Similar to the batch processing mode, the continuous fibers or cloths would then pass through a water rinse and in-line furnace.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

While the specification concludes with claims particularly pointing out and distinctly claiming that which is regarded as the present invention, the features, objects, and advantages of the present invention can be more readily ascertained with reference to the following description, in conjunction with the accompanying drawings, in which:

DETAILED DESCRIPTION

Figure 1:
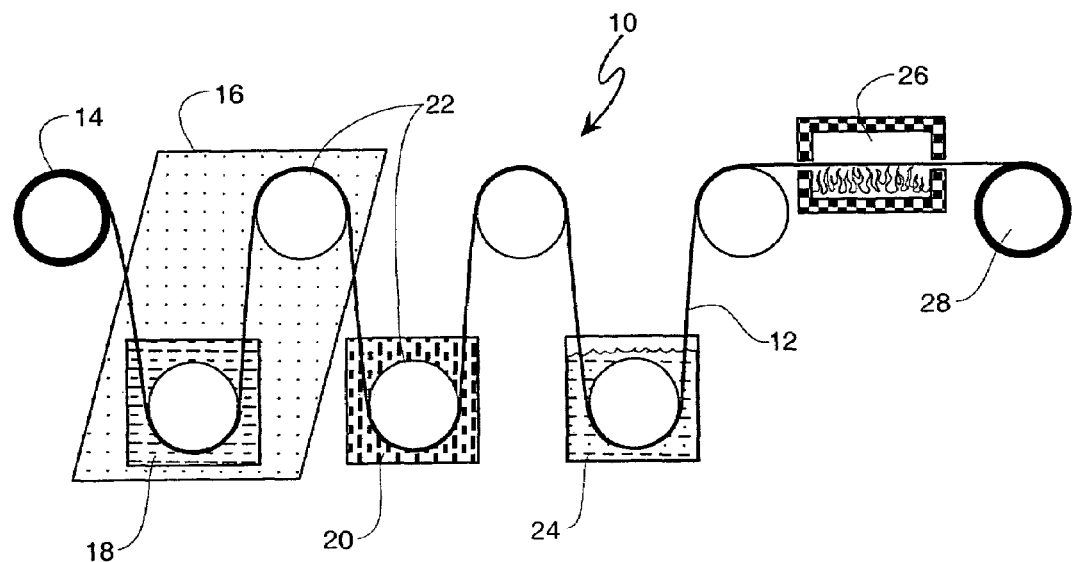
FIG. 1 illustrates a coating process for continuous fibers or cloths.

Referring to the drawing, FIG. 1 depicts a coating apparatus 10 for continuous ceramic fiber tows or cloths. The fibers 12, typically comprising a continuous multifilament tow or cloth of ceramic fibers, are removed from a feed spool 14 and passed through a vessel 16 containing chilled precursor solution 18. In one embodiment, the vessel 16 is refrigerated. The chilled precursor solution 18 contains a set of precursors, such as lanthanum citrate and phosphoric acid, for example, that have not yet reacted with each other.

As the fibers 12 exit the vessel 16, they entrain the chilled precursor solution 18. The fibers 12 then pass through a hot immiscible liquid 20, such as octanol, 2-ethyl-hexanol, for example, or warm water (at about 35° C. or above). Throughout the process, the fibers 12 are typically guided as appropriate over rollers 22. The rollers 22, in the continuous coating mode, act as mechanical agitators. Because of the hydrophilic nature of the saturated fibers 12, the chilled precursor solution 18 would not be displaced and the heat absorbed from the hot immiscible liquid 20 would cause the precipitation of solids onto the fibers 12 through heterogeneous nucleation and growth. The fibers 12 then pass through a water rinse 24 and an inline furnace 26 before being wound up on a take-up reel 28. The water rinse 24 preferably contains de-ionized water.

The process can be repeated, for any desired number of stages, to increase the coating thickness or thicknesses. The process substantially reduces the time and cost required to coat ceramic fibers compared to those processes previously known in the art.

Figure 2:
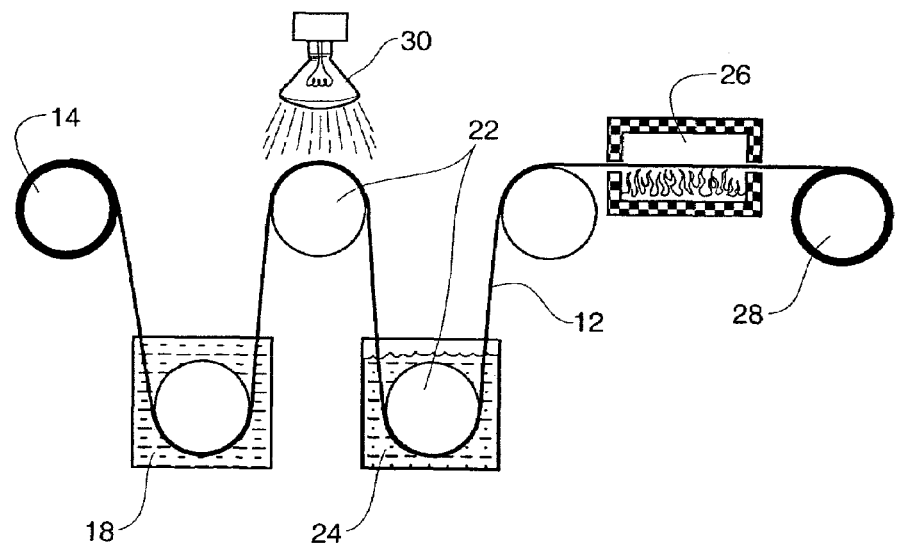
FIG. 2 illustrates an alternative embodiment of the coating process for continuous fibers or cloths.

In one alternative embodiment, depicted in FIG. 2, a heat lamp 30 may be used to supply the necessary heat to cause the precipitation of the coating from the chilled precursor solution 18, thereby eliminating the need for the hot immiscible liquid 20. Heat from the inline furnace 26 may be used for this purpose in alternative embodiments. In one embodiment, the fibers 12 are exposed for approximately one hour at about 900° C.

The coating process also works well in the batch mode, where any desired configuration of ceramic fibers or woven cloths of ceramic fibers may be inserted into a bath (not shown) of the chilled precursor solution 18. The temperature of the mixture in the bath containing the chilled precursor solution 18 and ceramic fibers is typically about 5° C. or lower. The ceramic fibers may be mechanically agitated, such as by rollers, for example. Once the ceramic fibers have been sufficiently wetted, the mixture is warmed to room temperature (approximately 17-24° C.) to allow for reaction of the precursors. This allows for heterogeneous nucleation and growth of the coating material (such as rhabdophane, for example).

In one embodiment, the mixture is further heated to hasten the completeness of reaction. In the case of rhabdophane coating material on Nextel 610 and 720 fibers, for example, the mixture is heated to approximately 35° C. The entire process can be repeated as desired to obtain the desired coating thickness.

In general, the solids concentration of the chilled precursor solution 18 must be considerably higher in the continuous mode (typically greater than about 50 g/L) than in the batch mode (typically about 1-5 g/L).

In alternative embodiments, the ceramic fibers or cloths may be inserted into chilled precursor solution having a high solids loading (greater than about 30 g/L) until the fibers or cloths are saturated. Mechanical agitation may be used to facilitate the saturation. The fibers or cloths are then removed from the chilled solution and immediately submerged in warm water (typically above about 35° C.) for a brief period. The fibers or cloths are then rinsed and dried.

A high degree of coating uniformity was achieved, as evident from micrographs of the coated fibers, with this process using Nextel 610 cloth coated in five stages with precursors configured to yield 3.0 g/L and 4.7 g/L of monazite.

In one embodiment, mechanical agitation of the ceramic fibers is used prior to precipitation to improve the uniformity of coating. Rolling of the fibers, using a hard rubber roller, for example, produces improved uniformity in the coating. A wide variety of means may be used to achieve the mechanical agitation, such as rolling, ultrasonic bath, or vibratory support surface, for example. The mechanical agitation of a cloth of Nextel 610 fibers, by rolling with a hard rubber roller for five minutes in each of the ten stages, resulted in uniform coatings as evident in micrograph images. In other embodiments, mechanical agitation of the fibers is used to facilitate rinsing of the fibers in de-ionized water.

The process is expected to work well for any choice of precursors that react as a function of temperature due to kinetic limitations. An alternative embodiment utilizes precursors that react as a function of pH. That is, the precursors are combined in a solution (not shown) where the pH is established such that no reaction occurs until, after the fibers are sufficiently wetted, the pH is modified such that nucleation and growth occur. This may be accomplished, for example, with chemical additives such as urea which decompose and increase the pH upon heating in aqueous solution. In such cases, it is the pH dependence of the solubility product constant that must be considered.

Alternative functional fiber coatings such as $CaWO_4$ or $(Y,La)PO_4$, for example, may also be produced using the coating methods described herein.

Characteristics of the described and illustrated embodiments are intended for illustrative purposes and are not to be considered limiting or restrictive. It is to be understood that various adaptations and modifications may be made to the embodiments presented herein by those skilled in the art without departing from the spirit and scope of the invention, as defined by the following claims and equivalents thereof.

We claim:

1. A method of coating ceramic fibers, comprising:
   combining a plurality of coating precursors into a chilled precursor solution;
   inserting the ceramic fibers into said chilled precursor solution;

wetting the ceramic fibers with said chilled precursor solution;

increasing the temperature of said chilled precursor solution; and removing the ceramic fibers from said chilled precursor solution.

2. The method of claim 1, wherein said plurality of coating precursors include lanthanum citrate and phosphoric acid.

3. The method of claim 1, further comprising the step of inserting the ceramic fibers into hot immiscible liquid.

4. The method of claim 1, further comprising the step of mechanically agitating said chilled precursor solution containing the ceramic fibers and said plurality of coating precursors.

5. The method of claim 4, wherein said step of mechanically agitating said chilled precursor solution includes rolling the ceramic fibers wetted with said chilled precursor solution with at least one rubber roller.

6. The method of claim 1, further comprising the step of rinsing the ceramic fibers with a solution containing de-ionized water.

7. The method of claim 1, further comprising the step of firing the ceramic fibers with a high-temperature heat source.

8. A method for coating ceramic fibers with rhabdophane, comprising:

combining phosphoric acid with lanthanum citrate into a chilled solution;

wetting the ceramic fibers in said chilled solution;

heating said chilled solution to create a warm solution;

removing the ceramic fibers from said warm solution;

rinsing the ceramic fibers with a rinse containing de-ionized water;

drying the ceramic fibers; and firing the ceramic fibers with a high-temperature heat source.

9. The method of claim 8, further comprising the step of mechanically agitating the ceramic fibers in said chilled solution.

* * * * *